D. M. KEFAUVER.
PASTRY BAKING PAN.
APPLICATION FILED FEB. 24, 1913.
1,168,511.
Patented Jan. 18, 1916.
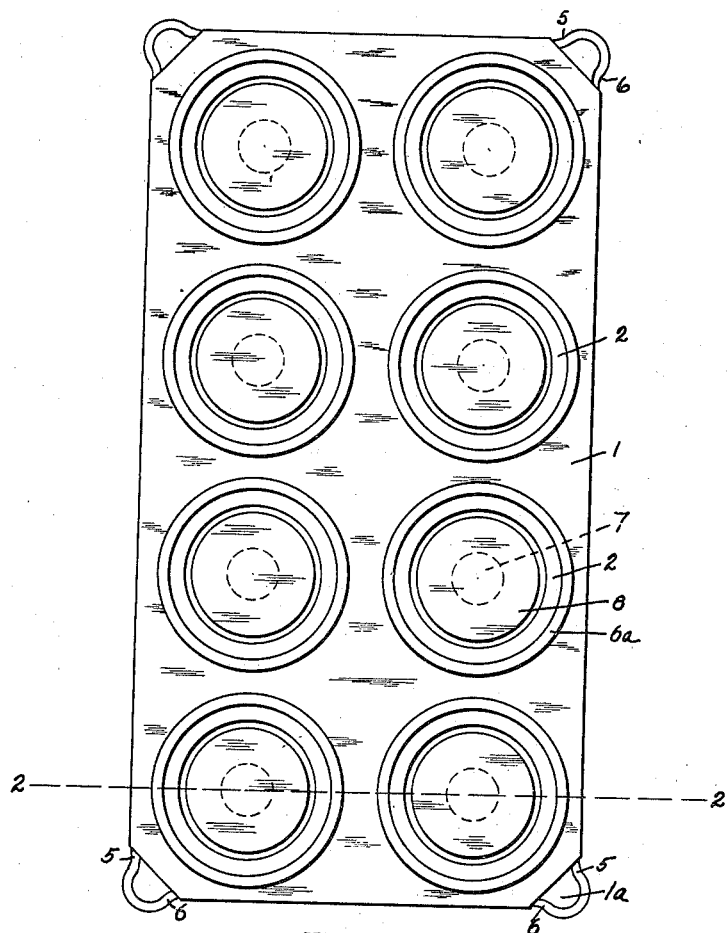
Fig. 1
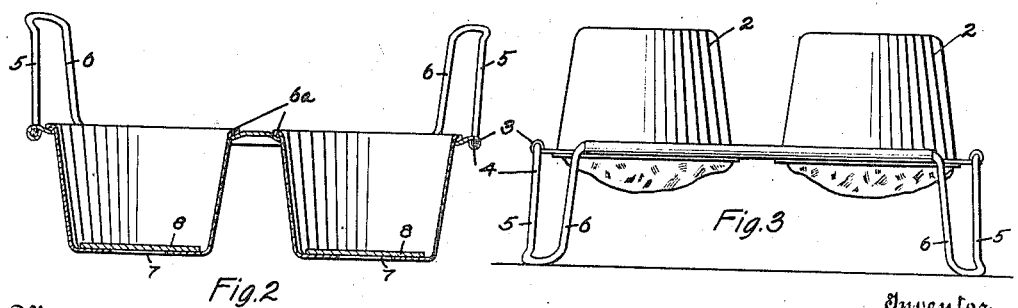
Fig. 2
Fig. 3
Witnesses
L. W. Frost
A. L. Phelps
Inventor
Della M. Kefauver
By
C. D. Shepherd, Attorney

UNITED STATES PATENT OFFICE.

DELLA M. KEFAUVER, OF COLUMBUS, OHIO.

PASTRY-BAKING PAN.

1,168,511.  Specification of Letters Patent.  Patented Jan. 18, 1916.

Application filed February 24, 1913. Serial No. 750,197.

*To all whom it may concern:*

Be it known that I, DELLA M. KEFAUVER, a citizen of the United States, residing at Columbus, in the county of Franklin and State of Ohio, have invented certain new and useful Improvements in Pastry-Baking Pans, of which the following is a specification.

My invention relates to pastry baking pans of the type particularly used in baking cakes and similar articles requiring shallow cup-like pans. Considerable difficulty has always been experienced in removing these baked articles from the pans after they have been baked, due to their sticking or clinging to the sides and bottom of the pan. It also often times happens that when the baked article has been removed from the pan, its center will fall or settle. Both these features are very undesirable to the average cook and means are herein provided for effectively overcoming them.

It has been found that by temporarily holding the baked article in an inverted position, the settling or falling of its center is overcome. My invention, therefore, contemplates the provision of means for holding the baking pan containing the baked article, in slightly spaced relation with a supporting table or similar structure when in an inverted position. In the use of a structure such as this, I have found it extremely desirable to also provide means for preventing the sticking of the bottom of the article to the bottom of the pan, thus always insuring a baked article of perfect form.

The preferred embodiment of my invention is shown in the accompanying drawings, in which similar characters of reference designate corresponding parts, and in which:

Figure 1 is a plan view of the preferred type of construction of my invention, Fig. 2 is a section taken on line 2—2 of Fig. 1, and, Fig. 3 is a view of my baking pan shown in its inverted position and showing the baked articles ready for removal.

In carrying out my invention, I employ any well known type of baking pan and for the purposes of illustration, I have shown my invention applied to what is known as a gem pan. This pan comprises a rectangular top plate 1, suitably apertured at regular intervals for the reception of the cups 2 and having its outer edges turned over as at 3 to embrace the wire 4. This wire 4 is preferably continuous for the purposes of stiffening the top plate which is cut away at each corner as at 1$^a$ to allow the upturning of the wire to form upwardly extending and connected legs 5 and 6. These legs may extend upwardly any desired distance, but I have found a distance equal to approximately the depth of each cup 2 to be amply sufficient. Each of the cups 2 desirably has its upper edge crimped over as at 6$^a$ and suitably soldered or otherwise secured to the top plate 1. The bottom of each cup 2 is shown as being centrally apertured as at 7, which aperture is normally covered by the provision of a supplemental and removable bottom 8.

The use of my device is similar to the devices at present in use, in that the dough is deposited in the cups 2, after the supplemental bottom pieces 8 have been placed in their respective positions. After the dough has been sufficiently baked, the entire structure may be temporarily inverted and the baked article held in spaced relation with its supporting structure by means of the legs 5 and 6. In this manner, settling of the baked article so common, is effectively overcome. A knife may be run around the side walls of each cup to free the sides of the article and a slight pressure exerted upon the supplemental bottoms 8 by a finger inserted through the apertures 7 will force the entire article out upon the table, thereby overcoming its tendency to stick to the bottom of each pan. The supplemental bottoms 8 may be very readily removed and the baking article maintained intact. It is apparent that I have provided very simple means for accomplishing the objects of my invention.

What I claim, is:

A baking pan comprising a member provided with a plurality of cup-shaped pans each having an apertured bottom, a removable supplemental disk bottom for each pan, and upwardly extending supporting legs at the corners of said member of a height approximately equal to the depth of said pans and adapted to support said member when in an inverted position.

In testimony whereof I affix my signature in presence of two witnesses.

DELLA M. KEFAUVER.

Witnesses:
 WALTER E. L. BOCK,
 C. C. SHEPHERD.